(12) United States Patent
Hao

(10) Patent No.: US 7,439,438 B2
(45) Date of Patent: Oct. 21, 2008

(54) MUSICAL NOTATION SYSTEM PATTERNED UPON THE STANDARD PIANO KEYBOARD

(76) Inventor: Jia Hao, House 1023, Villa Yosemite, Shun Yi District, Beijing (CN) 101302

( * ) Notice: Subject to any disclaimer, the term of this patent is extended or adjusted under 35 U.S.C. 154(b) by 50 days.

(21) Appl. No.: 11/277,502

(22) Filed: Mar. 26, 2006

(65) Prior Publication Data

US 2007/0221043 A1    Sep. 27, 2007

(51) Int. Cl.
G09B 15/02 (2006.01)
(52) U.S. Cl. .................... 84/483.2; 84/483.2; 84/470 R
(58) Field of Classification Search ............ 84/483.2, 84/477 R
See application file for complete search history.

(56) References Cited

U.S. PATENT DOCUMENTS

| | | | | |
|---|---|---|---|---|
| 104,393 | A * | 6/1870 | Wright | 84/483.1 |
| 152,726 | A * | 7/1874 | Kramer | 84/428 |
| 347,686 | A * | 8/1886 | Carpenter | 84/483.1 |
| 733,351 | A * | 7/1903 | Beswick | 84/483.2 |
| 881,085 | A * | 3/1908 | Shires | 84/483.1 |
| 1,133,074 | A * | 3/1915 | Von Unschuld-Lazard | 84/470 R |
| 1,354,214 | A * | 9/1920 | Robinson | 84/473 |
| 1,473,495 | A * | 11/1923 | Miller | 84/483.2 |
| 3,888,155 | A * | 6/1975 | Leonard | 84/471 R |
| D251,790 | S * | 5/1979 | Fritz | D19/1 |
| 5,496,179 | A * | 3/1996 | Hoffman | 434/433 |
| 5,574,238 | A * | 11/1996 | Mencher | 84/483.2 |
| 5,886,273 | A * | 3/1999 | Haruyama | 84/478 |
| 5,962,800 | A * | 10/1999 | Johnson et al. | 84/483.2 |
| 6,057,501 | A * | 5/2000 | Hale | 84/470 R |
| 6,307,139 | B1 * | 10/2001 | Iwamura | 84/601 |
| 6,388,181 | B2 * | 5/2002 | Moe | 84/477 R |
| 6,476,303 | B1 * | 11/2002 | Mutou et al. | 84/483.2 |
| 6,566,593 | B2 * | 5/2003 | Pertchik | 84/423 R |
| 6,689,946 | B2 * | 2/2004 | Funaki | 84/478 |
| 6,987,220 | B2 * | 1/2006 | Holcombe | 84/483.2 |
| 7,220,907 | B2 * | 5/2007 | McIntosh | 84/477 R |
| 7,253,349 | B1 * | 8/2007 | Saltsman | 84/424 |
| 2001/0037720 | A1 * | 11/2001 | Funaki | 84/478 |
| 2004/0055441 | A1 * | 3/2004 | Katsuta | 84/470 R |
| 2004/0139843 | A1 * | 7/2004 | Forster | 84/483.2 |
| 2005/0241462 | A1 * | 11/2005 | Hirano | 84/600 |

(Continued)

OTHER PUBLICATIONS

Introducing Kidsnotes, Noteheasd with embedded characters, http://www.dvmpublications.com/kidnotes_information.htm, viewed Nov. 1, 2007.*

(Continued)

*Primary Examiner*—Walter Benson
*Assistant Examiner*—Robert W Horn

(57) ABSTRACT

An improved musical notation system, which uses a staff patterned upon the standard piano keyboard. It replaces the Grand Staff's system of lines and spaces with a system of "pitch stripes" of two colors arranged in the same pattern as the black and white keys of the standard piano keyboard. Music scores, especially those for keyboard music, produced with the art are significantly easier to understand and sight-read. The art further incorporates positional numerical music notes to marry positional notation and numerical notation of music in the same musical score. The art further facilitates a method by which music scores of the same music in different keys can be obtained easily by moving all markings and notes collectively up or down the staff.

2 Claims, 3 Drawing Sheets

U.S. PATENT DOCUMENTS

2007/0221043 A1* 9/2007 Hao .................. 84/477 R
2008/0141849 A1* 6/2008 Johnston ............... 84/483.2

OTHER PUBLICATIONS

Book music, music notes as perforated holes, practiced as early as 1863, http://en.wikipedia.org/wiki/Book_music, viewed Nov. 1, 2007.*

Piano roll view, explanation and screen shot © 2006, http://www.parabola.me.uk/melys/man/c294.html, and /piano.png, viewed Nov. 1, 2007.*

KlavarScript—Klavar notation software, reads MIDI, edit, print and save the music., version from 2002-2004, http://www.vdkolk.nl/klavar/mainpage-en.htm.*

Piano Roll Graph Paper, Jul. 19, 2000 contact J.B. Roth, http://mmd.foxtail.com/Tech/rothPRgraphPaper.html, viewed Nov. 1, 2007.*

Wingdings, font developed in 1990 by Microsoft, http://en.wikipedia.org/wiki/Wingdings, viewed Nov. 1, 2007.*

Klavarskribo, introduced in 1931, by Dutchman Cornelis Pot, http://en.wikipedia.org/wiki/Klavarskribo, viewed Oct. 31, 2007.*

Klavar Music (trial lesson), http://www.klavarmusic.com/KMSIL_Trial_Lesson_2006.pdf, viewed Oct. 31, 2007.*

* cited by examiner

MUSICAL NOTATION SYSTEM PATTERNED UPON THE STANDARD PIANO KEYBOARD

BACKGROUND OF THE INVENTION

1. Technical Field

Musical staff and notation system.

2. Background

The long-used Grand Staff and numerical notation systems. As these systems have been commonly used for a long time, their technical details can be found in all kinds of music theory books. This document will only describe the background technologies' problems and shortcomings, which the invention is intended to address.

I. The High Threshold of the Entrance to the World of Music
   a) Perhaps for the reason of saving printing space and paper (a few hundred years ago), each stave of 5 lines (of the Grand Staff) contains 14 to 15 standard pitches. For example, the G stave contains 9 named pitches and 5 varied pitches. The F stave contains 9 named pitches and 6 varied pitches. This is a highly condensed system. Squeezing so many pitches into such a narrow space makes remembering, recognizing the pitches noted on the stave a formidable task.
   b) The use of constant or accidental sharp signs and flat signs (and cancellation signs) in the Grand Staff is an acquired ability that can only be obtained by hard memory and repeated practice (for a long time). Such complicated rules make it very difficult (and seriously limiting the chance) for people to fully master the Grand Staff.
   c) Most of the music scores for piano pieces are written with/on Grand Staff. When learning to play the piano, in the absence of a music staff that is more and visually corresponding to the piano keyboard, the student must fully master the ability to read the Grand Staff. Given the difficulty to fully master the Grand Staff as elaborated in b) above, the Grand Staff becomes a necessary (but unnecessarily high) threshold for the piano students. The effort spent overcoming this threshold is irrelevant to the actual development of the student's musical talent and piano playing skills.
   d) Because the piano keyboard has all the standard pitches in the entire music system, the teaching of music theory today is usually illustrated with it. But because most of the music pieces are written with the Grand Staff to date, and in the absence of a music staff that is more naturally and visually corresponding to the piano keyboard, the teaching materials and the teachers must spend a lot of words and efforts in teaching how all the standard pitches (as represented by all the keys on the piano keyboard) are recorded and recognized in the Grand Staff. Many students lose the chance of fully understanding the music theory because of their inability to fully master the Grand Staff.

Summarizing above, the difficult Grand Staff is a high threshold today for the entrance to the world of music. The height of this threshold makes the process of entering the world of music a difficult and painful one, depriving many of the chance to enter, enjoy and excel in the world of music. It is an object of the present invention to significantly lower this threshold.

II. Pitch Notation or Numerical Notation?

All in this field know that the Grand Staff is based on pitch notation, i.e. the absolute height of all the standard pitches (e.g. C, D, E, F, G, A, B, etc.). It is more suitable for recording scores for musical instruments and playing the instruments by such scores. But it is not easy to sing. On the other hand, numerical notation is based on the relative heights of the notes in relation to the key-note of the music piece (e.g. 1, 2, 3, 4, 5, 6, 7 of a major scale, 1 being the key-note). It is easier to sing, and helps critically in the understanding of parts of the music theory, such as scales and chords. But it is not suitable for recording the more complex scores for musical instruments.

Therefore, in order to master all aspects of music (including singing, instrument playing and music theory), the student of music must master both the Grand Staff and numerical notation, and the ability to translate one into another. This requires significant amount of time input and specialized training.

The background technologies cannot display the absolute and relative heights of the notes together. This makes it difficult for students to fully master the important aspects of music, and, therefore, seriously limiting the potential of development of many in the world of music. Solving this problem is another object of the present invention.

III. Difficulty to Obtain or Produce Music Scores on Different Keys

It is very easy to obtain the music score of numerical notation on different Keys. One simply has to equate the key-note to a new letter named pitch. For example, 1=D can be changed to 1=E to show that a D major Key is shifted to E major Key. 6=D can be changed to 6=E to show that a D minor Key is shifted to E minor Key. All the numerical notes remain unchanged.

However, most of the music pieces today are written with the Grand Staff. Producing scores on different Keys on the Grand Staff is a tedious, time/effort consuming, and error-prone process. Although one can do it by changing the key signatures and/or the clefs, the scores of shifted keys produced this way tend to be very difficult to read. Solving this problem of the background technology is another object of the present invention.

DISCLOSURE OF INVENTION

1. A blank musical staff of pitch stripes for recording musical scores. The staff is the same as the long-standing "five-line staff" (commonly known as the Grand Staff), except for the following aspects:

The present invention replaces the Grand Staff's complex system of lines, spaces, sharp signs, flat signs, and accidentals with a system of horizontally arranged pitch stripes of two colors (Marking 1 in Drawings FIG. 1). The system comprises of a multiple of horizontal stripes of two colors, stacked up together. Pitch stripes of one color (preferably the darker color) represent the black keys of the piano keyboard. Pitch stripes of the other color (preferably the lighter color) represent the white keys of the piano keyboard. Pitch stripes of the relatively lower positions correspond to the piano keys lying relatively more towards the left-hand side. Pitch stripes of the relatively higher positions correspond to the piano keys lying relatively more towards the right-hand side. The vertical pattern of sequence (from low to high) of the pitch stripes of two colors is the same as the horizontal sequence (from left to right) of the black and white keys of the piano keyboard. In other words, every pitch stripe corresponds to a key on the piano, i.e. a standard pitch in the music theory. As some of the white keys of the piano keyboard are positioned next to each other (e.g. E and F, B and C, etc), a fine line can be drawn between them, so that the pairs of pitch strips representing white keys can be visually identified as two individual pitch stripes. "Color(s)" in this paragraph is used to mean all colors, including white, black and different shades of grey.

When filling in the notes in the said blank musical staff format to produce music score, the note-heads should be positioned within the pitch stripes, preferably centered vertically.

The pitch stripes representing the black keys may have the same width as those representing the white keys. Or, they may be somewhat narrower than those representing the white keys (e.g. in the same width proportion as that of the black and white keys on the typical piano keyboard). See Drawings FIG. 2.

Different from the Grand Staff (which uses one, or more together, five-line staves), the present invention does not limit the number of pitch stripes in a stave. Only one stave is used. The number of pitch strips to choose depends on the pitch coverage of the music. It can be, as a maximum, the same number of keys of a standard piano, i.e. one can choose for the stave to cover all the 88 standard pitches of the entire modern music system. Therefore, clefs and Key signatures are no longer necessary, nor applicable, in the presently invented blank staff format. Depending on the needs of users of different levels, one can choose to mark (with the lettered pitch names at the left-hand side beginning of the stave) just one pitch stripe (e.g. the key-note pitch stripe), or certain chosen pitch stripes, or all the pitch stripes. All pitch stripes representing the white keys of the piano keyboard may be marked with the lettered names (as those normally used in the music theory) for the corresponding white keys of the piano keyboard, e.g., $A_2$, $B_2$, $C_1$, $D_1$, $E_1$, $F_1$, $G_1$, $A_1$, $B_1$, C, D, E, F, G, A, B, c, d, e, f, g, a, b, $c^1$, $d^1$, $e^1$, $f^1$, $g^1$, $a^1$, $b^1$, $c^2$, $d^2$, $e^2$, $f^2$, $g^2$, $a^2$, $b^2$, $c^3$, $d^3$, $e^3$, $f^3$, $g^3$, $a^3$, $b^3$, $c^4$, $d^4$, $e^4$, $f^4$, $g^4$, $a^4$, $b^4$, $c^5$. All pitch stripes representing the black keys of the piano keyboard may be marked with the lettered names of those pitch stripes (representing white keys) immediately below them, together with a sharp sign (#), or they may be marked with the lettered names of those pitch stripes (representing white keys) immediately above them, together with a flat sign (b). See Drawings FIG. 1's Marking 2.

For the purpose of saving printing space, there is a need of minimizing the number of pitch strips used to limit the width of the stave. Depending on individual needs, one may choose from the following 3 measures:

1) Use the octave sign (8 or 8va), as normally used in the Grand Staff.
2) Use additional ledger pitch stripes, as normally practiced in the Grand Staff (with ledger lines added above or below the stave).
3) Combined use of 1) and 2) above.

The present invention provides special benefits in learning, practicing and playing of the piano. Meanwhile, it also helps greatly the learning of music theory. It effectively lowers the existing "high threshold" for entrance to the world of music.

2. A form of "numerical positional notes". The said form of musical notes is the same as the usual notes used on the Grand Staff, except for the following aspects:

The present invention replaces the note-heads (see Drawings FIG. 1's Marking 3) of the usual notes used on the Grand Staff with numerical note-heads. The numerical note-heads are constructed by adding the numbers used in numerical notation to the presently commonly used note-heads. The numbers can be added inside the note-heads, or close to them. The number to be added to a note-head should be the degree in scale as represented by the note-head. According to modern music theory as well as the common use of numerical notation, seven numbers (1, 2, 3, 4, 5, 6, and 7, sung as Do, Re, Mi, Fa, Sol, La, Si), or a selection from them, are used in all scales.

If necessary (as required by some special scales or music pieces), sharp (#) or flat (b) signs can be added next to the numbers.

In numerical notation, dot(s) are added above (or below) a numerical note to signal that the note should be played or sung one (or several) octaves higher (or lower) than what the note normally represents. These dots are no longer necessary in the present invention because the relevant pitch stripe (where the numerical positional notes appears) shows the actual pitch of the note.

As there are solid and hollow note-heads (representing different lengths of the notes' sound), in the case that numbers, possibly together with sharp signs or flat signs, are situated inside the note-heads, solidly printed numbers/signs can be used for hollow note-heads, negatively printed numbers/signs (or numbers/signs printed in a color different than that of the note-heads') can be used for solid note-heads.

The present invention can enable the user to see the pitch notes as well as the numerical notes that they represent in a scale together, and, therefore, effectively incorporates the merits (and overcome the shortcomings) of the pitch notation system (the Grand Staff) and numerical notation system.

3. The combined use of the above said blank musical staff of pitch stripes and the above said numerical positional notes can be more beneficial to the music worker and students. The color of the notes and other markings may be chosen from any color other than the two colors used for the pitch stripes, so that the notes and markings can be read. As shown in Drawings FIGS. 1, 2, and 3, white color is chosen for the pitch stripes representing all white piano keys, grey color is chosen for the pitch stripes representing all black piano keys, and black color is chosen for the notes.

4. The above said blank musical staff of pitch stripes (when all the pitch stripes are of the same width) can make possible a much simpler, faster and error-proof method (than any prior art) of obtaining or producing a musical score on a different Key. As every pitch stripe represents one standard pitch in the musical system, and as every pitch stripe is of the same width, one can obtain new music scores of the same music piece on shifted Keys by simply shifting all the notes and markings of the original music score collectively up or down on the said blank musical staff of pitch stripes. The lettered name of the pitch stripe where the key-note (i.e. 1 in major scales and 6 in minor scales) falls represent the Key of the music piece. For example, if the key-note 1 of a major scale music piece falls on pitch stripe G, the music score for the piece has a Key of G major. If the key-note 6 of a minor scale music piece falls on pitch stripe A, the music score for the piece has a Key of A minor. This method solves the problem of the background technology as described in III. Above. As illustrated in Drawings FIG. 3, the music piece's Key is shifted from C major to #C major by collectively moving all the notes up by one pitch stripe.

BRIEF DESCRIPTION OF THE DRAWINGS

The drawings are for illustration purposes and shall not limit the claims of the invention.

Figure 1:
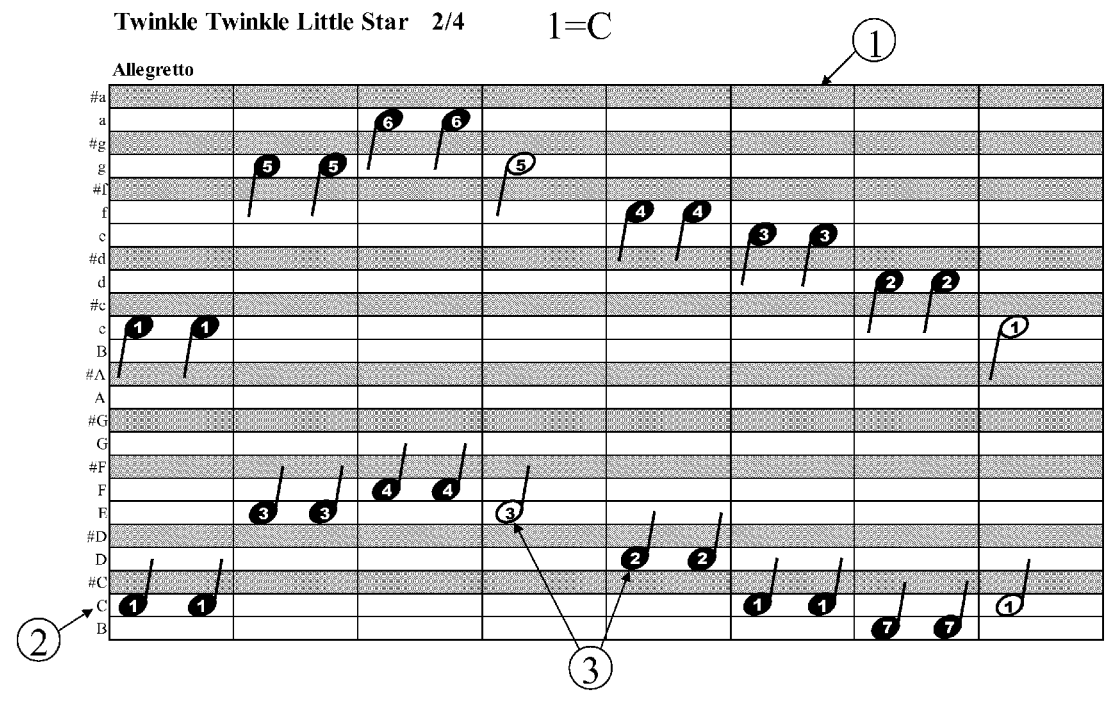

FIG. 1: The musical staff and notation system which incorporates both the Grand Staff and numerical notation, and is based on a pattern visually corresponding to the keyboard of the piano. Marking 1 shows the blank musical staff of horizontally arranged pitch stripes of two colors. The pitch stripes in this illustration are of the same width. Marking 2 shows the lettered pitch names marking the pitch stripes. Marking 3 shows the numerical positional notes.

Figure 2:
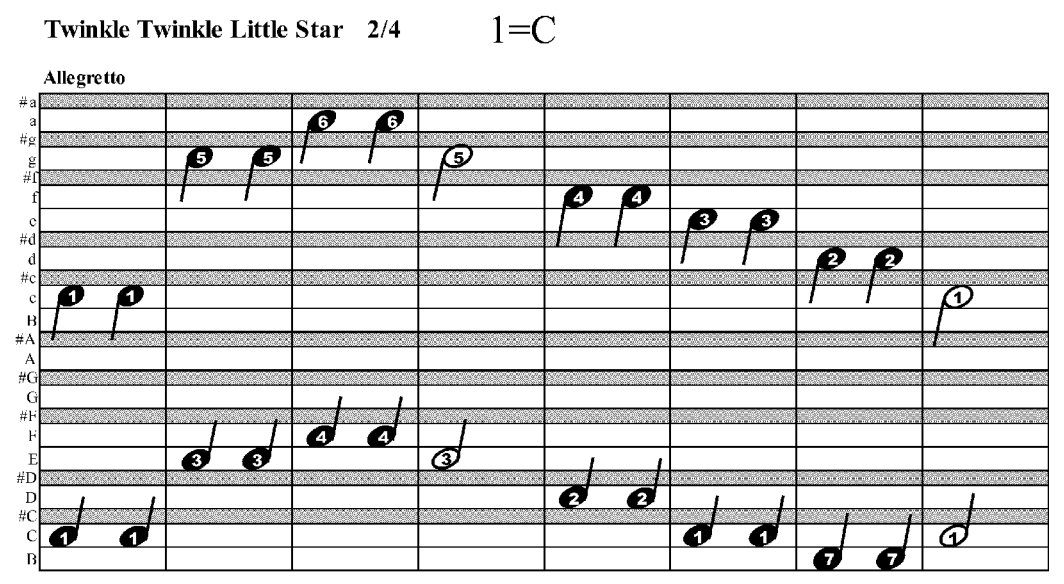

FIG. 2: Another application design of the said blank musical staff of horizontally arranged pitch stripes of two colors, in which the pitch stripes representing the black piano keys are somewhat narrower than those representing the white piano keys, giving the staff more resemblance of the piano keyboard.

BEST MODE FOR CARRYING OUT INVENTION

Figure 3:
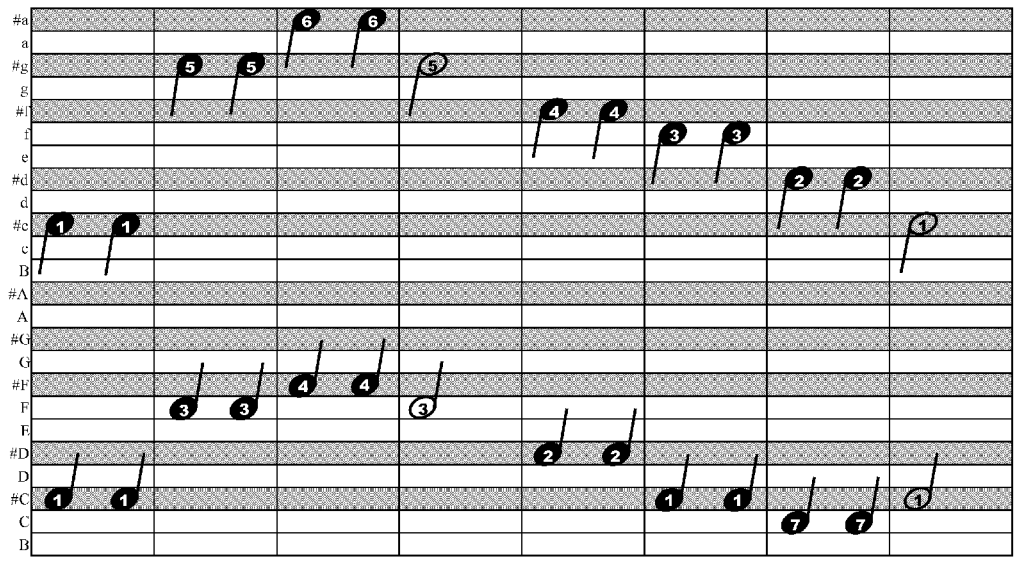
FIG. 3: An example of producing music score on shifted Key. This figure shows that the same music in FIG. 1, which had a C major Key, is now having a #C major key. This is achieved by collectively moving all the notes up (against the staff of pitch stripes) by one pitch stripe (or semi-tone).

Books or other printed materials can be produced with the said blank musical staff of pitch stripes to help compose, copy, or publish musical scores (by writing or typing on the blank musical staff).

Computer programs or software can be produced with the said blank musical staff of pitch stripes to help compose, enter, copy, transmit, import, export, publish, or print musical scores. Such computer programs or software can also be made with the function to assist producing music scores on shifted Keys using the above said method.

Music scores by the Grand Staff and numerical notation can be reproduced with the music staff of the present invention, and published into books and other teaching materials for the benefit of all music workers and students.

A special kind of tool-book can be produced in which the contents of the music (notes and other markings) and the blank staff of pitch stripes can be printed on separate sheets with one of them (e.g. the blank staff of pitch stripes) being printed on transparent sheets. The tool-book can be designed and made in such a way that the sheets with the contents of the music and the (transparent) sheets with the blank staff of pitch stripes can move vertically against each other, so that music scores on shifted Keys can be obtained or produced using the said above said method.

The invention claimed is:

1. The invention claimed is an improved musical notation system for recording and representing musical scores, comprising:
   a staff, or stave, of horizontally arranged pitch stripes of two colors, stacked up together;
   pitch stripes of one color represent the black keys of the standard piano keyboard;
   pitch stripes of the other color represent the white keys of the standard piano keyboard;
   pitch stripes lying in relatively lower positions correspond to the keys lying relatively more towards the left-hand side of the piano keyboard;
   pitch stripes lying in relatively higher positions correspond to the keys lying relatively more towards the right-hand side of the piano keyboard;
   the vertical pattern of arrangement from low to high of the pitch stripes of two colors is identical to the horizontal arrangement from left to right of the black and white keys of the standard piano keyboard;
   the single staff comprises the number of pitch stripes (some may be additionally added short "ledger stripes") to span all the notes of a line of music;
   music notes and symbols that are commonly used with the Grand Staff, such as time signatures, barlines, whole notes or semi-breves, half notes or minims, quarter notes or crotchets, eighth notes or quavers, sixteenth notes or semi-quavers, thirty-second notes or demi-semi-quavers, sixty-fourth notes or hemi-demi-semi-quavers, hundred twenty-eighth notes or quasi-hemi-semi-quavers and two hundred fifty-sixth notes, rests, dots, ties, beams, tuplets, signs for tempo, dynamics, mood, articulation (phrasing, slurs, staccato, etc.), reiterations and repeats, expressions, ornaments and embellishments, etc., all as commonly found and described in English dictionaries or encyclopedias published in the United States of America or the United Kingdom; numerical positional noteheads which are constructed by adding numbers used in the numerical notation in the noteheads of the musical notes;
   key signature marking relative to the musical staff that identifies the root note of the scale of the music score represented (i.e. 1 in the major scales and 6 in minor scales) in terms of pitch names;
   music scores are produced by marking the aforesaid music notes on the aforesaid staff, positioning the note-heads of the said music notes upon the correct pitch stripes indicating the correct keys on the piano keyboard to be played.

2. The musical notation system for recording and representing musical scores of claim 1, wherein,
   all the pitch stripes are of the same vertical width; and
   producing a musical score in different scales is performed by shifting all the notes and markings of an original music score collectively up or down the blank musical staff and amending the key signature accordingly.

* * * * *